(12) United States Patent
Chen

(10) Patent No.: US 11,546,788 B2
(45) Date of Patent: Jan. 3, 2023

(54) CONFIGURATION METHOD AND DEVICE OF MEASUREMENT REPORTING, MEASUREMENT REPORTING METHOD AND DEVICE

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/632,781

(22) PCT Filed: Jul. 2, 2018

(86) PCT No.: PCT/CN2018/093983
§ 371 (c)(1),
(2) Date: Jan. 21, 2020

(87) PCT Pub. No.: WO2019/015471
PCT Pub. Date: Jan. 24, 2019

(65) Prior Publication Data
US 2020/0213887 A1    Jul. 2, 2020

(30) Foreign Application Priority Data
Jul. 21, 2017    (CN) .......................... 201710602524.1

(51) Int. Cl.
*H04W 24/10*    (2009.01)
*H04W 72/12*    (2009.01)
(Continued)

(52) U.S. Cl.
CPC ....... *H04W 24/10* (2013.01); *H04W 72/1263* (2013.01); *H04W 88/06* (2013.01); *H04W 88/10* (2013.01)

(58) Field of Classification Search
CPC . H04W 24/10; H04W 72/1263; H04W 88/06; H04W 88/10; H04W 52/02; H04W 52/0248; Y02D 30/70
See application file for complete search history.

(56) References Cited

U.S. PATENT DOCUMENTS

2009/0247150 A1 * 10/2009 Fischer ................. H04W 24/10
                                                                  455/425
2010/0041412 A1    2/2010 Yu
(Continued)

FOREIGN PATENT DOCUMENTS

CN    101299860 A    11/2008
CN    101953222 A    1/2011
(Continued)

OTHER PUBLICATIONS

First Chinese Office Action Application No. 201710602524.1; dated Nov. 20, 2019.
(Continued)

*Primary Examiner* — Julio R Perez
(74) *Attorney, Agent, or Firm* — von Briesen & Roper, s.c.

(57) ABSTRACT

A configuration method of measurement reporting, a measurement reporting method and device are provided. The configuration method of measurement reporting applied to a base station includes: configuring, according to current state information of a terminal, information of a corresponding measurement configuration for the terminal, wherein the information of the measurement configuration configured for measurement reporting of the terminal.

20 Claims, 5 Drawing Sheets

(51) Int. Cl.
*H04W 88/06* (2009.01)
*H04W 88/10* (2009.01)

(56) References Cited

U.S. PATENT DOCUMENTS

| | | | | |
|---|---|---|---|---|
| 2010/0287489 | A1* | 11/2010 | Alles | H02J 3/00 |
| | | | | 715/772 |
| 2012/0120906 | A1* | 5/2012 | Pan | H04L 1/0026 |
| | | | | 370/329 |
| 2013/0210437 | A1 | 8/2013 | Martin et al. | |
| 2016/0100355 | A1* | 4/2016 | Chen | H04W 48/16 |
| | | | | 370/232 |
| 2021/0077719 | A1* | 3/2021 | Cardinali | A61M 5/1723 |

FOREIGN PATENT DOCUMENTS

| | | | |
|---|---|---|---|
| CN | 103906123 A | 7/2014 | |
| CN | 105592496 A | 5/2016 | |
| CN | 105636106 A | 6/2016 | |
| CN | 105682135 A | 6/2016 | |
| EP | 3331177 A1 * | 6/2018 | ............. H04J 11/00 |
| WO | WO 2017/015465 A1 | 1/2017 | |

OTHER PUBLICATIONS

European Search Report Application No. 18834833.8; dated May 5, 2020.
International Search Report & Written Opinion related to Application No. PCT/CN2018/093983; dated Sep. 18, 2018.

* cited by examiner

CONFIGURATION METHOD AND DEVICE OF MEASUREMENT REPORTING, MEASUREMENT REPORTING METHOD AND DEVICE

CROSS-REFERENCE TO RELATED APPLICATION

This patent application is a 35 USC § 371 U.S. national stage of International Application No. PCT/CN2018/093983 filed on Jul. 2, 2018, which claims priority to a Chinese Patent Application No. 201710602524.1, filed in China on Jul. 21, 2017, the disclosure of which is incorporated herein by reference in its entirety.

TECHNICAL FIELD

The present disclosure relates to the field of wireless communication technology, and in particular, relates to a configuration method of measurement reporting, a configuration device of measurement reporting, a measurement reporting method, and a measurement reporting device.

BACKGROUND

In a Long Term Evolution (LTE) system, a base station transmits information of a measurement configuration to a User Equipment (UE) via a Radio Resource Control (RRC) signaling, and the terminal performs measurement (intra-frequency measurement, inter-frequency measurement, or inter-system measurement) according to content of the information of the measurement configuration, and then triggers reporting of a measurement result to a UE according to a configured measurement reporting event, or reports a measurement result to a base station periodically.

Regardless of a current state of the UE (whether the UE is movable or not, a current moving state of the UE, a state of a network to which the UE currently belongs, and a state of a channel which the UE is currently using), a configuration, configured by the base station, of measurement reporting of the terminal is unchanged. There is no difference in the configuration for the UE in different states, which is detrimental to saving power for some stationary terminals or some terminals having low-moving speeds.

SUMMARY

The present disclosure provides a configuration method of measurement reporting and a device, and a measurement reporting method and a device. The configuration method of measurement reporting and the device, and the measurement reporting method and the device provided by the present disclosure, perform different measurement reporting configurations according to different states of a terminal, so as to realize differentiated configurations. In a case that the terminal is in a state that does not require frequent measurement reporting, a quantity of times of measurement reporting is reduced to achieve the purpose of saving power.

In a first aspect, some embodiments of the present disclosure provide a configuration method of measurement reporting. The configuration method of measurement reporting is applied to a base station and includes: configuring, according to current state information of a terminal, information of a corresponding measurement configuration for the terminal, wherein the information of the measurement configuration is used for measurement reporting of the terminal.

In a second aspect, some embodiments of the present disclosure provide a measurement reporting method. The measurement reporting method is applied to a terminal and includes: performing, according to information of a measurement configuration transmitted by a base station, measurement reporting, wherein the information of the measurement configuration is determined from current state information of the terminal.

In a third aspect, some embodiments of the present disclosure provide a base station, the base station includes a configuration module, configured to configure, according to current state information of a terminal, information of a corresponding measurement configuration for the terminal, wherein the information of the measurement configuration is used for measurement reporting of the terminal.

In a fourth aspect, some embodiments of the present disclosure provide a terminal. The terminal includes: a measurement reporting module, configured to perform, according to information of a measurement configuration transmitted by a base station, measurement reporting, wherein the information of the measurement configuration is determined from current state information of the terminal.

In a fifth aspect, some embodiments of the present disclosure further provide a base station. The base station includes: a storage, a processor and a computer program stored in the storage and executable by the processor; wherein when the processor executes the computer program, the processor implements the above configuration method of measurement reporting applied to a base station described.

In a sixth aspect, some embodiments of the present disclosure further provide a terminal. The terminal includes: a storage, a processor and a computer program stored in the storage and executable by the processor; wherein when the processor executes the computer programs, the processor implements the above measurement reporting method applied to a terminal.

In a seventh aspect, some embodiments of the present disclosure provide a computer readable storage medium storing therein a computer program; when the program is executed by a processor, the processor implements steps of the above configuration method of measurement reporting.

In an eighth aspect, some embodiments of the present disclosure provide a computer readable storage medium storing therein a computer program; when the program is executed by a processor, the processor implements steps of the above measurement reporting method.

In this way, in some embodiments of the present disclosure, the base station may configure information of different measurement configurations for the terminal in different states according to current state information of the terminal, so as to realize differential configurations; in a case that the terminal is in a state that does not require frequent measurement reporting, a quantity of times of the measurement reporting is reduced to achieve the purpose of saving power.

BRIEF DESCRIPTION OF THE DRAWINGS

In order to more clearly illustrate technical solutions in some embodiments of the present disclosure, drawings used in the description of some embodiments of the present disclosure will be briefly introduced below. Obviously, the drawings in the following description are only some embodiments of the present disclosure. Based on these drawings, other drawings may be obtained by a person of ordinary skill in the art without paying any creative effort.

DETAILED DESCRIPTION

Figure 1:
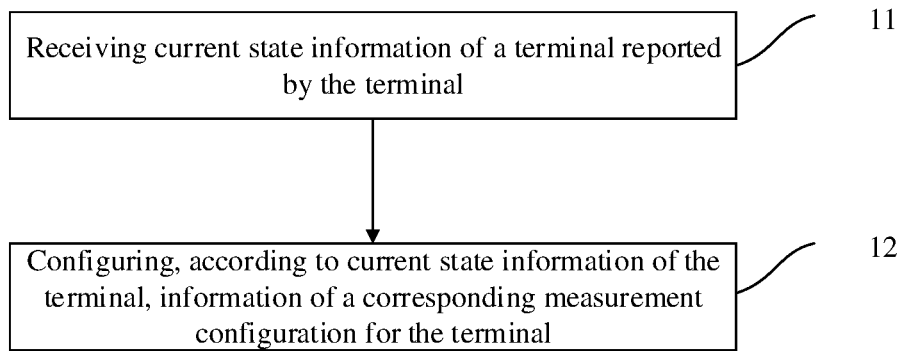
FIG. 1 is a schematic flowchart illustrating a configuration method of measurement reporting according to some embodiments of the present disclosure.

In order to make objectives, technical solutions and advantages of the present disclosure more apparent, the technical solutions of the present disclosure will be clearly and completely described below with reference to the drawings of the present disclosure. Obviously, the described embodiments are some, rather than all, of embodiments of the present disclosure. Based on the embodiments of the present disclosure, all other embodiments derived by a person of ordinary skill in the art shall fall within the scope of the present disclosure.

A configuration method of measurement reporting is provided by some embodiments of the present disclosure. The method is applied to a base station and includes: configuring, according to current state information of a terminal, information of a corresponding measurement configuration for the terminal, wherein the information of the measurement configuration is used for measurement reporting of the terminal.

In some embodiments of the present disclosure, information of different measurement configurations is configured for terminals in different states according to the current state information of the terminal, so as to realize differentiated configurations. In a case that a terminal is in a state that does not require frequent measurement reporting (e.g., a stationary state, or a low moving-speed state), times of the measurement reporting are reduced to achieve a purpose of saving power.

The base station in some embodiments of the present disclosure may be a Base Transceiver Station (BTS, for short) in a Global System of Mobile communication (GSM, for short) or a Code Division Multiple Access (CDMA, for short), a NodeB (NB. for short) in a Wideband Code Division Multiple Access (WCDMA), an Evolutional Node B (eNB or eNodeB, for short) in a Long Term Evolution (LTE), or a relay station or an access point, or a base station in a future Fifth-Generation (5G) mobile communication network, etc., which is not limited herein.

In some embodiments of the present disclosure, the current state information of the terminal may include at least one of: a type of the terminal, whether the terminal is movable or not, a highest moving speed of the terminal, a current moving state of the terminal, a current service state of the terminal, a state of a network where the terminal is currently located, and a state of a channel that the terminal is currently in.

The type of the terminal may include types that the terminal is a mobile terminal, an Internet of Things terminal, or an immobile terminal, etc. Since different types of the terminal have different mobility abilities, for example, some Internet of Things terminals cannot move frequently, and therefore do not need to frequently perform a reselection procedure or a handover procedure. In a case that the base station configures measurement reporting for this type of terminal, this type of terminal may be configured to not perform frequent measurement reporting, the times of the measurement reporting are reduced to save power consumption of the terminal.

Whether the terminal is movable or not is determined by the type of the terminal or an environment in which the terminal is located. The highest moving speed of the terminal is also related to the type of the terminal.

The current moving state of the terminal may include: a stationary state, a low moving-speed state or a high moving-speed state, etc. It may be understood that, in a case that the terminal is in the stationary state or in the low moving-speed state, since the reselection procedure or the handover procedure is not required to be performed frequently, this type of terminal may be configured with information of measurement reporting different from that for a terminal in a high moving-speed state in a case that the base station configures the measurement reporting for this type of terminal, so as to avoid frequent measurement reporting performed by this type of terminal, and to save power consumption of the terminal. In a case that the terminal is in a high moving-speed state, a reselection procedure or a handover procedure may be required to be performed, therefore, in a case that the base station configures the measurement reporting for this type of terminal, this type of terminal may be configured to perform normally the measurement reporting to ensure that the terminal may perform the reselection procedure or the handover procedure normally. In some embodiments of the present disclosure, determining whether a terminal is in a moving state generally refers to that, after the terminal is in the certain state for a preset Lime duration, it is determined that the terminal is in the state. In some embodiments of the present disclosure, the low moving-speed state refers to a moving state in which a moving speed is lower than or equal to a first preset speed threshold, the high moving-speed state refers to a moving state in which a moving speed is higher than or equal to a second preset speed threshold, and the first preset speed threshold and the second preset speed threshold may be determined as needed. For example, the first preset speed threshold may be 30 km/h or 60 km/h, and the second preset speed threshold may be 120 km/h.

The current service state of the terminal refers to whether the terminal has a call service or a data service, etc. or not. For example, in a case that a terminal performs a certain data service, the base station may configure different contents of information of measurement reporting for the terminal, in a case that the base station configures the measurement reporting for the terminal, so as to ensure normal transmission of the data service and avoid frequent measurement reporting performed by the terminal that affects the normal transmission of the data service.

The state of the network where the terminal is currently located or the state of the channel that the terminal is currently in may include: a signal quality of a network side to which the terminal is currently connected, etc. It may be understood that in a case that the terminal is connected to a network having a better signal quality, the reselection procedure or the handover procedure is usually not required to be performed, while in a case that the terminal is in a network having a poor signal quality, the reselection procedure or the handover procedure may be required to be performed. Therefore, the base station may configure a corresponding configuration of measurement reporting for the terminal according to the state of the network where the terminal is currently located.

In some embodiments of the present disclosure, when determining the current state information of the terminal, it is generally determined that the terminal is in a state only after the terminal is in the state for a preset time duration, so as to prevent misjudgment.

Similarly, in some embodiments of the present disclosure, when determining a change of the current state information of the terminal, it is generally determined that the state of terminal is changed or the terminal is in the changed state only after the state of the terminal is changed and the terminal is in the changed state for a predetermined time duration; or it is generally determined that the state of the terminal is changed or the terminal is in the changed state only after changes of states of the terminal reach a preset number of times, so as to prevent misjudgment.

In some embodiments of the present disclosure, the information of measurement configuration configured by the base station for the terminal may include a measurement reporting event and/or a parameter corresponding to the measurement reporting event, which are described below by way of example.

In some specific embodiments of the present disclosure, the step of configuring, according to the current state information of the terminal, the information of the corresponding measurement configuration for the terminal may include: configuring, for the terminal, a corresponding measurement reporting event and/or a parameter corresponding to the measurement reporting event according to the current state information of the terminal, wherein the parameter corresponding to the measurement reporting event includes a threshold parameter and an offset quantity parameter. The measurement reporting event refers to a measurement reporting event specified in a related protocol, that is, a measurement reporting event used in a case that the base station performs a related configuration of measurement reporting. The threshold parameter and the offset quantity parameter used in some embodiments of the present disclosure are both a threshold parameter and an offset quantity parameter corresponding to a related measurement reporting event.

The measurement reporting event specified in the related protocol refers to any one of measurement reporting events A1 to A6, B1, B2, C1, C2, W1 to W3, V1 and V2 that are defined in a LTE protocol TS 36.331 or 5G New Radio (NR) protocol TS 38.331.

In some embodiments of the present disclosure, in a case that a measurement reporting event and/or a parameter corresponding to the measurement reporting event are configured for the terminal, the current state information of the terminal is taken into consideration, so that a configuration of measurement reporting is more in line with requirements of the terminal in different states. For example, in a case that the current state information of the terminal is the stationary state, an offset quantity with a larger value may be selected for the measurement reporting event, such that a condition for triggering the measurement reporting becomes stricter, thereby reducing the times of measurement reporting to achieve the purpose of saving power.

In some other embodiments of the present disclosure, the step of configuring, according to the current state information of the terminal, the information of the corresponding measurement configuration for the terminal may include: configuring, for the terminal, a corresponding measurement reporting event and/or a parameter corresponding to the measurement reporting event according to the current state information of the terminal, wherein the parameter corresponding to the measurement reporting event includes an offset quantity parameter corresponding to the current state information of the terminal. The measurement reporting event refers to a measurement reporting event specified in a related protocol, that is, a measurement reporting event used in a case that the base station performs related configuration of measurement reporting. The offset quantity parameter used in some embodiments of the present disclosure is an offset quantity parameter corresponding to the current state information of the terminal, such that the measurement reporting event is more in line with requirements of the terminal in different states.

In some other embodiments of the present disclosure, the step of configuring, according to the current state information of the terminal, the information of the corresponding measurement configuration for the terminal may include: configuring, for the terminal, a corresponding measurement reporting event and/or a parameter corresponding to the measurement reporting event according to the current state information of the terminal, wherein a trigger condition of the measurement reporting event is the current state information of the terminal or a change in the current state information.

In some embodiments of the present disclosure, the information of measurement configuration configured by the base station for the terminal may also include a measurement reporting mode, that is, the step of configuring, according to the current state information of the terminal, the information of the corresponding measurement configuration for the terminal may include: configuring, according to the current state information of the terminal, a corresponding measurement reporting mode for the terminal, wherein different measurement reporting modes correspond to different measurement configurations. The measurement reporting modes may include: a low required RRM measurement mode (or low required idle mode measurement (LM for short)) or a power saving mode (PS for short).

In the low required RRM measurement mode or the power saving mode, the terminal may select appropriate information of measurement configuration to reduce the times of the measurement reporting of the terminal, thereby achieving the effect of saving power.

How a base station acquires current state information of a terminal is described below by way of example.

Referring to FIG. 1, FIG. 1 is a schematic flowchart illustrating a configuration method of measurement reporting according to some embodiments of the present disclosure, and the configuration method of measurement reporting is applied to a base station and includes steps 11-12.

Step 11: receiving current state information of a terminal reported by the terminal.

Step 12: configuring, according to current state information of the terminal, information of a corresponding measurement configuration for the terminal, wherein the information of the measurement configuration is used for measurement reporting of the terminal.

In some embodiments of the present disclosure, the terminal directly reports current state information of the terminal to the base station, so that the base station may configure information of corresponding measurement configuration for the terminal in different states according to the current state information of the terminal, to achieve differentiated configuration. In a case that the terminal is in some states that do not require frequent measurement reporting to be performed, the times of measurement reporting may be reduced to achieve the purpose of saving power.

Figure 2:
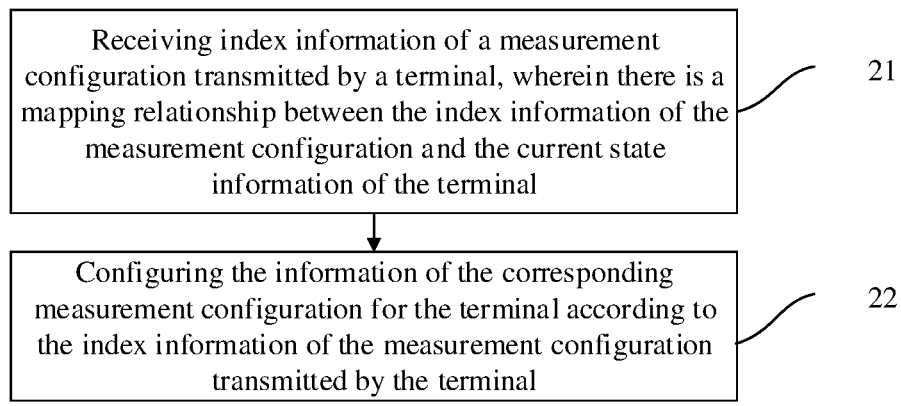
FIG. 2 is another schematic flowchart illustrating a configuration method of measurement reporting according to some embodiments of the present disclosure.

Referring to FIG. 2. FIG. 2 is another schematic flowchart illustrating a configuration method of measurement reporting according to some embodiments of the present disclosure, and the configuration method of measurement reporting is applied to a base station and includes steps 21-22.

Step 21: receiving index information of a measurement configuration transmitted by a terminal, wherein there is a mapping relationship between the index information of the measurement configuration and the current state information of the terminal.

In some embodiments of the present disclosure, the terminal needs to store a mapping relationship between the current state information of the terminal and the index of the measurement configuration. For example, the mapping relationship may be: a relationship in which the terminal is in the stationary state and the index of the corresponding measurement configuration is 00, a relationship in which the terminal is in the low moving-speed state and the index of the corresponding measurement configuration is 10, and a relationship in which the terminal is in the high moving-speed state and the index of the corresponding measurement configuration is 11. In a case that it is detected that a terminal is in a certain state, the index of measurement configuration corresponding to the current state of the terminal is queried from the stored mapping relationship.

Step 22: configuring the information of the corresponding measurement configuration for the terminal according to the index information of the measurement configuration transmitted by the terminal, wherein the information of the measurement configuration is used for measurement reporting of the terminal.

In some embodiments of the present disclosure, the base station needs to store the mapping relationship between the index information of the measurement configuration and information of the measurement configuration. In a case that the base station receives index information of a measurement configuration, the base station queries information of the measurement configuration corresponding to the index information of the measurement configuration from the stored mapping relationship.

In some embodiments of the present disclosure, the terminal transmits, to the base station, the index information of the measurement configuration corresponding to the state information of the terminal, so that the base station may easily determine, based on this index information, information of the measurement configuration that needs to be configured for the terminal. The base station does not need to analyze the current state information of the terminal, this implementation method is simple.

Figure 3:
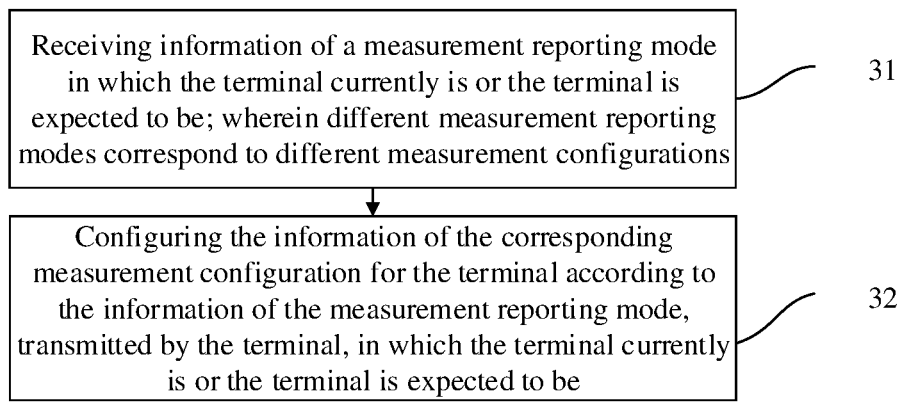
FIG. 3 is yet another schematic flowchart illustrating a configuration method of measurement reporting according to some embodiments of the present disclosure.

Referring to FIG. 3, FIG. 3 is yet another schematic flowchart illustrating a configuration method of measurement reporting according to some embodiments of the present disclosure, and the configuration method of measurement reporting is applied to a base station and includes steps 31-32.

Step 31: receiving information of a measurement reporting mode in which the terminal currently is or the terminal is expected to be; wherein different measurement reporting modes correspond to different measurement configurations.

The measurement reporting mode in which the terminal currently is or the terminal is expected to be may include: a low required RRM measurement mode (or low required idle mode measurement (LM for short)), or a power saving mode (PS for short), or may also include conventional measurement reporting mode.

Step 32: configuring the information of the corresponding measurement configuration for the terminal according to the information of the measurement reporting mode, transmitted by the terminal, in which the terminal currently is or the terminal is expected to be, wherein the information of the measurement configuration is used for measurement reporting of the terminal.

In some embodiments of the present disclosure, the terminal transmits, to the base station, the information of the measurement reporting mode in which the terminal currently is or the terminal is expected to be, such that the base station may configure information of different measurement configurations for the terminal according to information of this measurement mode. For example, in a case that the measurement mode is a low required RRM measurement mode or a power saving mode, the base station may configure a measurement reporting event with a larger threshold for the terminal, or configure a measurement reporting with a longer period to save power consumption of the terminal.

Figure 4:
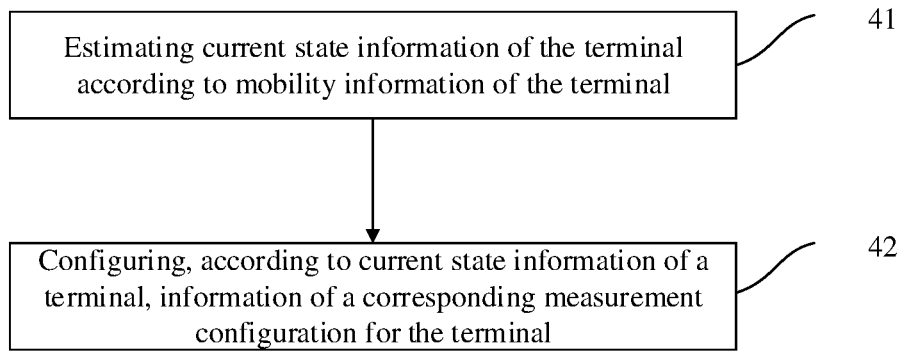
FIG. 4 is a further schematic flowchart illustrating a configuration method of measurement reporting according to some embodiments of the present disclosure.

Referring to FIG. 4, FIG. 4 is a further schematic flowchart illustrating a configuration method of measurement reporting according to some embodiments of the present disclosure, and the configuration method of measurement reporting is applied to a base station and includes steps 41-42.

Step 41: estimating current state information of the terminal according to mobility information of the terminal.

The mobility information of the terminal includes, but is not limited to, positioning information, such as a timing advance (TA) value or an AoA (Angle of Arrival of a measurement signal), of a signal transmitted by the terminal. Of course, the mobility information of the terminal or may also include other mobility information.

Step 42: configuring, according to current state information of a terminal, information of a corresponding measurement configuration for the terminal, wherein the information of the measurement configuration is used for measurement reporting of the terminal.

In some embodiments of the present disclosure, the base station determines the current state information of the terminal according to the mobility information of the terminal acquired by the base station, and reporting of the terminal is not required, which reduces network overhead caused by the reporting.

In the above embodiments of the present disclosure, the current state information of the terminal may be information stored in the terminal in advance, such as inherent information of the terminal including the type of the terminal, whether the terminal is movable or not, and the highest moving speed of the terminal and the like. In addition, the current state information of the terminal may also be detected by sensors built into the terminal, for example, whether the terminal is in a moving state or not, a moving speed of the terminal, and a signal quality of a network in which the terminal is located, etc.

In the above embodiments of the present disclosure, the information of the measurement configuration configured by the base station for the terminal may be configuration information of the measurement reporting event, or may be configuration information of periodic measurement reporting.

In the above embodiments of the present disclosure, in a case that the current state information of the terminal changes, the base station is triggered to configure information of corresponding measurement configuration for the terminal.

A measurement reporting method is also provided by some embodiments of the present disclosure. The measurement reporting method is applied to a terminal and includes: performing, according to information of a measurement configuration transmitted by a base station, measurement reporting, wherein the information of the measurement configuration is determined based on current state information of the terminal.

In some embodiments of the present disclosure, since the information of the measurement configuration transmitted by the base station is determined according to the current state information of the terminal, differentiated configuration may be achieved. In a case that the terminal is in some states that do not require frequent measurement reporting, the number of times of measurement reporting is reduced to achieve the purpose of saving power.

The terminal in some embodiments of the present disclosure may be a wireless terminal or a wired terminal, and the wireless terminal may be a device that provides voice and/or other service data connectivity to the user, a handheld device having a wireless connecting function, or other processing devices connected to a wireless modem. The wireless terminal may communicate with one or more core networks via a Radio Access Network (RAN), and the wireless terminal may be a mobile terminal, such as a mobile phone (or referred to as "cellular" phone) and a computer having a mobile terminal, for example, a portable mobile device, a pocket mobile device, a handheld mobile device, a computer built-in or in-vehicle mobile device that exchanges language and/or data with a wireless access network. For example, a Personal Communication Service (PCS) telephone, a cordless telephone, a Session Initiation Protocol (SIP) telephone, a Wireless Local Loop (WLL) station, a Personal Digital Assistant (PDA) or the like. The wireless terminal may also be referred to as a system, a Subscriber Unit, a Subscriber Station, a Mobile Station, a Mobile, a Remote Station, a Remote Terminal, an Access Terminal, a User Terminal, a User Agent, or a User Device or a User Equipment, and is not limited herein.

In some embodiments of the present disclosure, the current state information of the terminal may include at least one of: a type of the terminal, whether the terminal is movable or not, a highest moving speed of the terminal, a current moving state of the terminal, a current service state of the terminal, a state of a network where the terminal is currently located, and a state of a channel that the terminal is currently in.

In the above embodiments of the present disclosure, the current state information of the terminal may be information stored in the terminal in advance, such as inherent information of the terminal including the type of the terminal, whether the terminal is movable or not, and the highest moving speed of the terminal. In addition, the current state information of the terminal may also be detected by sensors built into the terminal, for example, whether the terminal is in a moving state or not, a moving speed of the terminal, and a signal quality of the network where the terminal is located, etc.

In some embodiments of the present disclosure, the information of measurement configuration includes: a corresponding measurement reporting event and/or a parameter corresponding to the measurement reporting event configured by the base station for the terminal according to the current state information of the terminal, wherein the parameter corresponding to the measurement reporting event includes a preset threshold parameter and an offset quantity parameter, or a corresponding measurement reporting event and/or a parameter corresponding to the measurement reporting event configured by the base station for the terminal according to the current state information of the terminal, wherein the parameter corresponding to the measurement reporting event includes an offset quantity parameter corresponding to the current state information of the terminal; or a corresponding measurement reporting event and/or a parameter corresponding to the measurement reporting event configured by the base station for the terminal according to the current state information of the terminal, wherein a trigger condition of the measurement reporting event is the current state information of the terminal or a change in the current state information.

In some embodiments of the present disclosure, the measurement reporting method further includes: performing the measurement reporting according to different measurement configurations corresponding to measurement reporting modes configured by the base station.

The following describes how a terminal reports current state information of the terminal to a base station by way of example.

Figure 5:
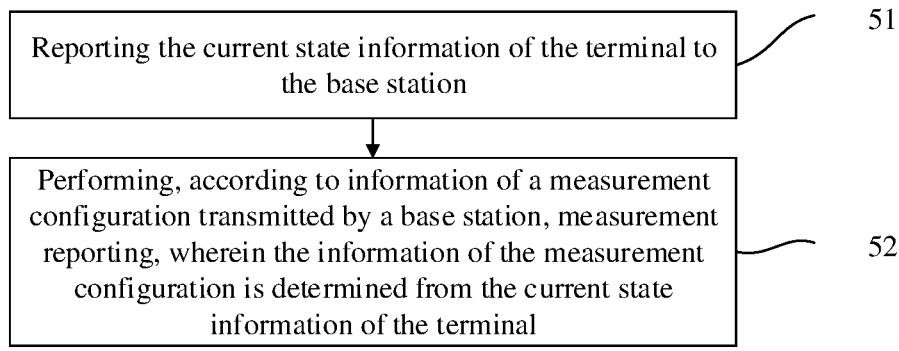
FIG. 5 is a schematic flowchart illustrating a measurement reporting method according to some embodiments of the present disclosure.

Referring to FIG. 5, FIG. 5 is a schematic flowchart illustrating a measurement reporting method according to some embodiments of the present disclosure, and the measurement reporting method is applied to a terminal and includes steps 51-52.

Step 51: reporting the current state information of the terminal to the base station.

Step 52: performing, according to information of a measurement configuration transmitted by a base station, measurement reporting, wherein the information of the measurement configuration is determined from the current state information of the terminal.

In some embodiments of the present disclosure, the terminal directly reports the current state information of the terminal to the base station, so that the base station may configure information of corresponding measurement configuration for the terminal according to the current state information of the terminal to achieve differentiated configuration. In a case that the terminal is in some states that do not require frequent measurement reporting, a quantity of times of measurement reporting is reduced to achieve the purpose of saving power.

Figure 6:
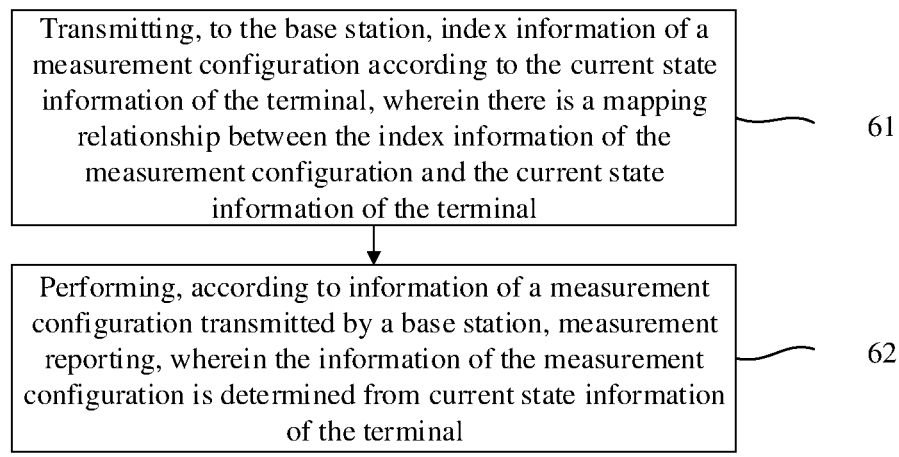
FIG. 6 is another schematic flowchart illustrating a measurement reporting method according to some embodiments of the present disclosure.

Referring to FIG. 6, FIG. 6 is another schematic flowchart illustrating a measurement reporting method according to some embodiments of the present disclosure, and the measurement reporting method is applied to a terminal and includes steps 61-62.

Step 61: transmitting, to the base station, index information of a measurement configuration according to the current state information of the terminal, wherein there is a mapping relationship between the index information of the measurement configuration and the current state information of the terminal.

In some embodiments of the present disclosure, the terminal needs to store the mapping relationship between the current state information of the terminal and the index of the measurement configuration. In a case that it is detected that terminal is in a certain state, the index of measurement configuration corresponding to the current state of the terminal is queried from the stored mapping relationship.

The base station needs to store the mapping relationship between the index information of the measurement configuration and information of the measurement configuration. In a case that the base station receives index information of a measurement configuration, the base station queries information of the measurement configuration corresponding to the index information of the measurement configuration from the stored mapping relationship.

Step 62: performing, according to information of a measurement configuration transmitted by a base station, measurement reporting, wherein the information of the measurement configuration is determined from current state information of the terminal.

In some embodiments of the present disclosure, the terminal transmits, to the base station, the index information of the measurement configuration corresponding to state information of the terminal, so that the base station may easily determine, based on this index information, information of the measurement configuration that needs to be configured for the terminal. The base station does not need to analyze the current state information of the terminal, and the implementation method is simple.

Figure 7:
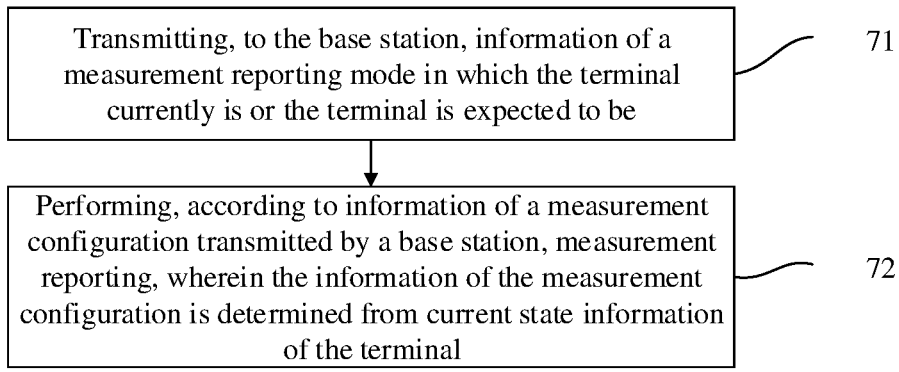
FIG. 7 is yet another schematic flowchart illustrating a measurement reporting method according to some embodiments of the present disclosure.

Referring to FIG. 7, FIG. 7 is another schematic flowchart illustrating a measurement reporting method according to some embodiments of the present disclosure, and the measurement reporting method is applied to a terminal and includes steps 71-72.

Step 71: transmitting, to the base station, information of a measurement reporting mode in which the terminal currently is or the terminal is expected to be; wherein different measurement reporting modes correspond to different measurement configurations.

The measurement reporting mode in which the terminal currently is or the terminal is expected to be may include: a low required RRM measurement mode (or low required idle mode measurement (LM for short)), or a Power Saving mode (PS for short).

The base station configures the information of corresponding measurement configuration for the terminal according to the information, transmitted by the terminal, of the measurement reporting mode in which the terminal currently is or the terminal is expected to be.

Step 72: performing, according to information of a measurement configuration transmitted by a base station, measurement reporting, wherein the information of the measurement configuration is determined from current state information of the terminal.

Based on the same inventive concept, some embodiments of the present disclosure further provide a base station, and the base station includes: a configuration module, configured to configure, according to current state information of a terminal, information of a corresponding measurement configuration for the terminal, wherein the information of the measurement configuration is used for measurement reporting of the terminal.

In some embodiments of the present disclosure, the base station configures information of different measurement configurations for the terminal in different states according to the current state information of the terminal, so as to realize differential configurations. In a case that the terminal is in a state that does not require frequent measurement reporting, a quantity of times of measurement reporting is reduced to achieve the purpose of saving power.

Optionally, in some embodiments of the present disclosure, the current state information of the terminal may include at least one of: a type of the terminal, whether the terminal is movable or not, a highest moving speed of the terminal, a current moving state of the terminal, a current service state of the terminal, a state of a network where the terminal is currently located, and a state of a channel that the terminal is currently in.

In some embodiments of the present disclosure, the configuration module includes: a first configuration unit, configured to configure, for the terminal, a corresponding measurement reporting event and/or a parameter corresponding to the measurement reporting event according to the current state information of the terminal, wherein the parameter corresponding to the measurement reporting event includes a preset threshold parameter and an offset quantity parameter.

In other embodiments of the present disclosure, the configuration module includes: a second configuration unit, configured to configure, for the terminal, a corresponding measurement reporting event and/or a parameter corresponding to the measurement reporting event according to the current state information of the terminal, wherein the parameter corresponding to the measurement reporting event includes an offset quantity parameter corresponding to the current state information of the terminal.

In some other embodiments of the present disclosure, the configuration module includes: a third configuration unit, configured to configure, for the terminal, a corresponding measurement reporting event according to the current state information of the terminal, wherein a trigger condition of the measurement reporting event is the current state information of the terminal or a change in the current state information.

In some embodiments of the present disclosure, the configuration module may further include: a fourth configuration unit, configured to configure, according to the current state information of the terminal, a corresponding measurement reporting mode for the terminal, wherein different measurement reporting modes correspond to different measurement configurations.

How a base station acquires current state information of a terminal is described below by way of example.

In some embodiments of the present disclosure, the base station further includes: a first reception module, configured to receive the current state information of the terminal reported by the terminal.

In some embodiments of the present disclosure, the base station further includes: a second reception module, configured to receive index information of the measurement configuration transmitted by the terminal, wherein there is a mapping relationship between the index information of the measurement configuration and the current state information of the terminal; the configuration module is further configured to configure the information of the corresponding measurement configuration for the terminal according to the index information of the measurement configuration transmitted by the terminal.

In some embodiments of the present disclosure, the base station further includes: a third reception module, configured to receive information of a measurement reporting mode in which the terminal currently is or the terminal is expected to be; wherein different measurement reporting modes correspond to different measurement configurations.

In some embodiments of the present disclosure, the base station further includes: a determination module, configured to estimate the current state information of the terminal according to mobility information of the terminal.

Some embodiments of the present disclosure further provide a terminal, the terminal includes: a measurement reporting module, configured to perform, according to information of a measurement configuration transmitted by a base station, measurement reporting, wherein the information of the measurement configuration is determined from current state information of the terminal.

In some embodiments of the present disclosure, since the information of the measurement configuration transmitted by the base station is determined according to the current state information of the terminal, differentiated configuration may be achieved. In a case that the terminal is in some states that do not require frequent measurement reporting, a quantity of times of measurement reporting is reduced to achieve the purpose of saving power.

In some embodiments of the present disclosure, optionally, the current state information of the terminal may include at least one of: a type of the terminal, whether the terminal is movable or not, a highest moving speed of the terminal, a current moving state of the terminal, a current service state of the terminal, a state of a network where the terminal is currently located, and a state of a channel that the terminal is currently in.

In some embodiments of the present disclosure, the information of measurement configuration includes: a corresponding measurement reporting event and/or a parameter corresponding to the measurement reporting event configured by the base station for the terminal according to the current state information of the terminal, wherein the parameter corresponding to the measurement reporting event includes a preset threshold parameter and an offset quantity parameter, or a corresponding measurement reporting event and/or a parameter corresponding to the measurement reporting event configured by the base station for the terminal according to the current state information of the terminal, wherein the parameter corresponding to the measurement reporting event includes an offset quantity parameter corresponding to the current state information of the terminal; or a corresponding measurement reporting event and/or a parameter corresponding to the measurement reporting event configured by the base station for the terminal according to the current state information of the terminal, wherein a trigger condition of the measurement reporting event is the current state information of the terminal or a change in the current state information.

In some embodiments of the present disclosure, the terminal further includes: a first transmission module, configured to report the current state information of the terminal to the base station.

In some embodiments of the present disclosure, the terminal further includes: a second transmission module, configured to transmit, to the base station, index information of the measurement configuration according to the current state information of the terminal, wherein there is a mapping relationship between the index information of the measurement configuration and the current state information of the terminal.

In some embodiments of the present disclosure, the terminal further includes: a third transmission module, configured to transmit, to the base station, information of a measurement reporting mode in which the terminal currently is or the terminal is expected to be; wherein different measurement reporting modes correspond to different measurement configurations.

In some embodiments of the present disclosure, the measurement reporting module is further configured to perform measurement reporting according to different measurement configurations corresponding to measurement reporting modes configured by the base station.

Some embodiments of the present disclosure further provide a base station including: a storage, a processor and a computer program stored in the storage and executable by the processor; wherein the processor is configured to execute the computer program to implement the above configuration method of measurement reporting applied to a base station.

Some embodiments of the present disclosure further provide a terminal including: a storage, a processor and a computer program stored in the storage and executable by the processor; wherein the processor is configured to execute the computer program to implement the above measurement reporting method applied to a terminal.

Some embodiments of the present disclosure further provide a computer readable storage medium storing therein a computer program, wherein when the program is executed by a processor, the processor implements steps of the above configuration method of measurement reporting, and the same technical effect may be achieved. To avoid redundancy, a repeated description is omitted herein. The above computer readable storage medium may be either volatile or non-volatile, such as a Read-Only Memory (ROM), a Random Access Memory (RAM), a magnetic disk or an optical disk, etc.

Some embodiments of the present disclosure further provide a computer readable storage medium storing therein a computer program, wherein when the program is executed by a processor, the processor implements steps of the above measurement reporting method, and the same technical effect may be achieved. To avoid redundancy, a repeated description is omitted herein. The above computer readable storage medium may be either volatile or non-volatile, such as a Read-Only Memory (ROM), a Random Access Memory (RAM), a magnetic disk or an optical disk, etc.

Figure 8:
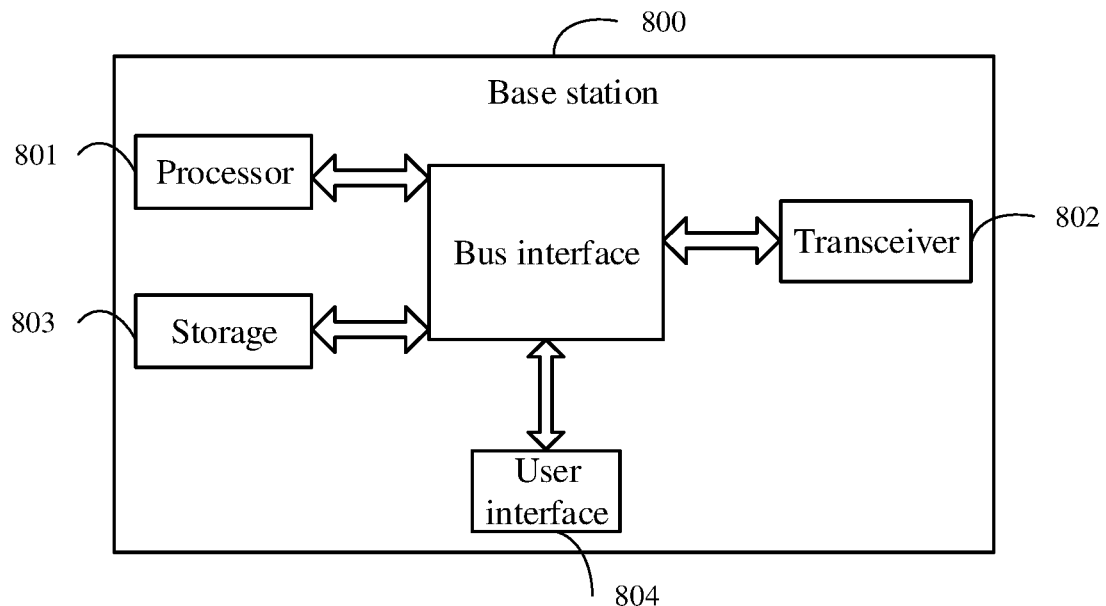
FIG. 8 is a structural diagram illustrating a base station according to some embodiments of the present disclosure.

Referring to FIG. 8, FIG. 8 is a structural diagram illustrating a base station according to some embodiments of the present disclosure. The base station may implement the details of the above configuration method of measurement reporting and the same technical effect may be achieved. As shown in FIG. 8, the base station 800 includes: a processor 801, a transceiver 802, a storage 803, a user interface 804 and a bus interface.

In some embodiments of the present disclosure, the base station 800 further includes: a computer program stored in the storage 803 and executable by the processor 801. When the computer program is executed by the processor 801, the processor 801 implements the following step: configuring, according to current state information of a terminal, information of a corresponding measurement configuration for the terminal, wherein the information of the measurement configuration is used for measurement reporting of the terminal.

In FIG. 8, a bus architecture may include any number of buses and bridges interconnected together. Various circuits, specifically, one or more processors represented by the processor 801 and a storage represented by the storage 803, are linked together. The bus architecture may also link various other circuits such as peripheral devices, voltage regulators and power management circuits, which are well known in the art, and therefore a further description thereof is omitted herein. The bus interface provides interfaces. The transceiver 802 may be a plurality of elements, that is, includes a transmitter and a receiver, to provide units configured to communicate with various other apparatuses over a transmission medium. For different user equipments, the user interface 804 may also be an interface capable of externally/internally connecting required devices which including but not limited to a keypad, a display, a speaker, a microphone, a joystick, and the like.

The processor 801 is responsible for managing the bus architecture and general processing, and the storage 803 may store data used by the processor 801 when performing operations.

Optionally, the current state information of the terminal may include at least one of: a type of the terminal, whether the terminal is movable or not, a highest moving speed of the terminal, a current moving state of the terminal, a current service state of the terminal, a state of a network where the terminal is currently located, and a state of a channel that the terminal is currently in.

Optionally, in a case that the computer program is executed by the processor 801, the processor 801 may further implement the following step: configuring, for the terminal, a corresponding measurement reporting event and/or a parameter corresponding to the measurement reporting event according to the current state information of the terminal, wherein the parameter corresponding to the measurement reporting event includes a preset threshold parameter and an offset quantity parameter, or configuring, for the terminal, a corresponding measurement reporting event and/or a parameter corresponding to the measurement reporting event according to the current state information of the terminal, wherein the parameter corresponding to the measurement reporting event includes an offset quantity parameter corresponding to the current state information of the terminal; or configuring, for the terminal, a corresponding measurement reporting event according to the current state information of the terminal, wherein a trigger condition of the measurement reporting event is the current state information of the terminal or a change in the current state information.

Optionally, in a case that the computer program is executed by the processor 801, the processor 801 may further implement the following step: prior to configuring, according to the current state information of the terminal, information of a corresponding measurement configuration for the terminal, receiving the current state information of the terminal reported by the terminal.

Optionally, in a case that the computer program is executed by the processor 801, the processor 801 may further implement the following step: prior to configuring, according to the current state information of the terminal, the information of the corresponding measurement configuration for the terminal, receiving index information of the measurement configuration transmitted by the terminal, wherein there is a mapping relationship between the index information of the measurement configuration and the current state information of the terminal; configuring, according to the current state information of the terminal, the information of the corresponding measurement configuration for the terminal includes: configuring the information of the corresponding measurement configuration for the terminal according to the index information of the measurement configuration transmitted by the terminal.

Optionally, in a case that the computer program is executed by the processor 801, the processor 801 may further implement the following step: prior to configuring, according to the current state information of the terminal, the information of the corresponding measurement configuration for the terminal, receiving information of a measurement reporting mode in which the terminal currently is or the terminal is expected to be; wherein different measurement reporting modes correspond to different measurement configurations.

Optionally, in a case that the computer program is executed by the processor 801, the processor 801 may further implement the following step: prior to configuring, according to the current state information of the terminal, the information of the corresponding measurement configuration for the terminal, estimating the current state information of the terminal according to mobility information of the terminal.

Optionally, in a case that the computer program is executed by the processor 801, the processor 801 may further implement the following step: configuring, according to the current state information of the terminal, a corresponding measurement reporting mode for the terminal, wherein different measurement reporting modes correspond to different measurement configurations.

The base station in some embodiments of the present disclosure, configures information of different measurement configurations for the terminal in different states according to information of the current state of the terminal, so as to realize differential configurations. In a case that the terminal is in a state that does not require frequent measurement reporting, a quantity of times of measurement reporting is reduced to achieve the purpose of saving power.

Figure 9:
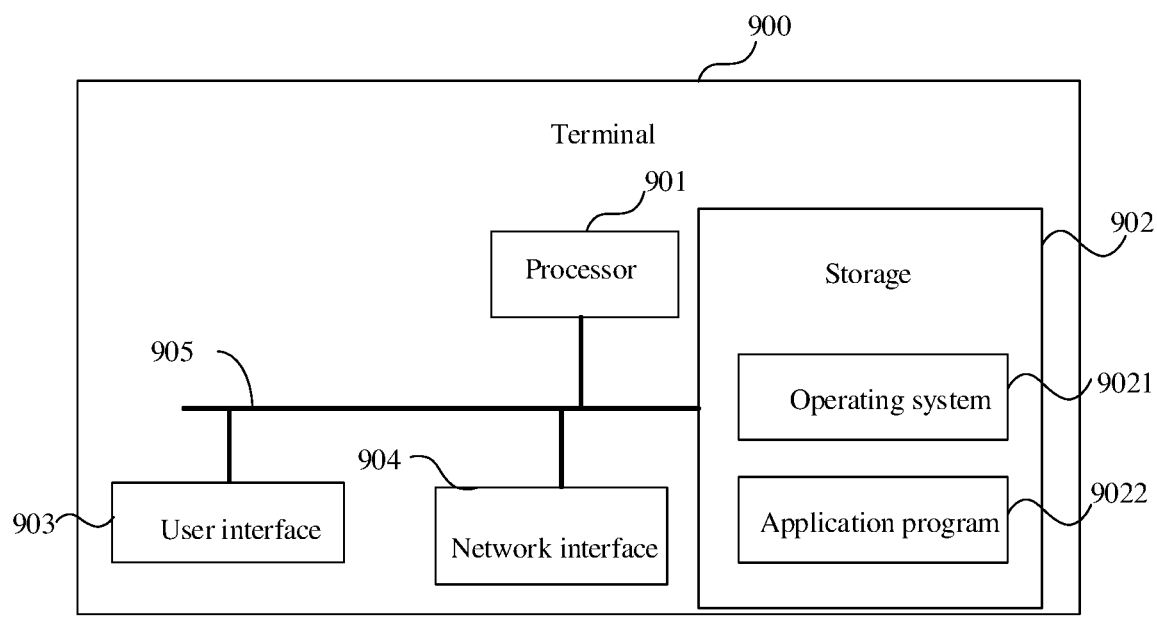
FIG. 9 is a structural diagram illustrating a terminal according to some embodiments of the present disclosure.

Referring to FIG. 9, some embodiments of the present disclosure provide a terminal 900. The terminal 900 shown in FIG. 9 includes: at least one processor 901, a storage 902, at least one network interface 904 and another user interface 903. The various components in terminal 900 are coupled together by a bus system 905. It will be appreciated that the bus system 905 is configured to enable connection communication between these components. The bus system 905 includes a power bus, a control bus, a status signal bus, and a data bus. However, for clarity of description, various buses are labeled as the bus system 905 in FIG. 9.

The user interface 903 may include a display, a keyboard, or a pointing device (e.g., a mouse), a trackball, a touchpad, or a touch screen, etc.

It is to be understood that the storage 902 in some embodiments of the present disclosure may be either a volatile storage or a non-volatile storage, or may include both volatile and non-volatile storage. The non-volatile storage may be a Read-Only Memory (ROM), a Programmable ROM (PROM), an Erasable PROM (EPROM), or an Electrically EPROM (EEPROM) or a flash memory. The volatile storage may be a Random Access Memory (RAM) that acts as an external cache. By way of example and without limitation, many forms of RAMs may be used, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a direct Rambus RAM (DRRAM). The storage 902 of the systems and methods described in the present disclosure is intended to include, but is not limited to, these and any other suitable types of storages.

In some embodiments, the storage 902 stores following elements, executable modules or data structures, or a subset thereof, or extended set thereof: an operating system 9021 and an application program 9022.

The operating system 9021 includes various system programs, such as a framework layer, a core library layer, a driver layer, and the like, for implementing various basic services and processing hardware-based tasks. The application program 9022 includes various application programs, such as a Media Player, a Browser, and the like, for implementing various application services, and a program implementing the methods of the embodiments of the present disclosure may be included in the application program 9022.

The terminal 900 further includes: a computer program stored in the storage 902 and executable by the processor 901, specifically, which may be a computer program in the application program 9022. When the computer program is executed by the processor 901, the processor 901 implements the following step: performing, according to information of a measurement configuration transmitted by a base station, measurement reporting, wherein the information of the measurement configuration is determined from current state information of the terminal.

The above method disclosed in some embodiments of the present disclosure may be applied in the processor 901 or implemented by the processor 901. The processor 901 may be an integrated circuit chip having a capability of processing signals. During an implementation process, steps of the method may be realized by hardware in a form of integrated logical circuits in the processor 901, or by software in a form of instructions. The processor 901 may be a general purpose processor, a Digital Signal Processor (DSP), an Application Specific Integrated Circuit (ASIC), a Field Programmable Gate Array (FPGA) or another programmable logic device, a discrete gate or a transistor logic device, a discrete hardware component, that is capable of implementing or executing the various methods, steps and logic block diagrams disclosed in some embodiments of the present disclosure. The general purpose processor may be a microprocessor, any conventional processor, etc. The steps of the methods disclosed with reference to the embodiments of the present disclosure may be embodied as being performed by a hardware decoding processor, or may be performed by a combination of hardware and software modules in a decoding processor. The software modules may reside in well-established storage medium in the art, such as a RAM, a flash memory, a ROM, a PROM or an EEPROM, a register. The storage medium resides in the storage 902. The processor 901 reads information from the storage 902 and performs the steps of the methods in combination hardware of the processor 901.

It may be understood that the modules or units of the base station described above or the modules or units of the terminal described above, or the method applied to the base station or the method applied to the terminal described in the present disclosure may be implemented by hardware, software, firmware, middleware, microcode or a combination thereof. For hardware implementation, processing units may be implemented in one or more Application Specific Integrated Circuits (ASIC), Digital Signal Processors (DSP), DSP Devices (DSPD), Programmable Logic Devices (PLD), Field Programmable Gate Arrays (FPGA), General Purpose processors, controllers, microcontrollers, microprocessors, other electronic units configured to perform the function described in the present application or a combination thereof.

For software implementation, techniques described in the present disclosure may be implemented by modules (e.g., processes, functions, etc.) that perform the functions described in the present disclosure. A software code may be stored in the storage and executed by the processor. The storage may be implemented within the processor or external to the processor.

Optionally, the current state information of the terminal includes at least one of: a type of the terminal, whether the terminal is movable or not, a highest moving speed of the terminal, a current moving state of the terminal, a current service state of the terminal, a state of a network where the terminal is currently located, and a state of a channel that the terminal is currently in.

Optionally, the information of measurement configuration includes: a corresponding measurement reporting event and/or a parameter corresponding to the measurement reporting event configured by the base station for the terminal according to the current state information of the terminal, wherein the parameter corresponding to the measurement reporting event includes a preset threshold parameter and an offset quantity parameter; or a corresponding measurement reporting event and/or a parameter corresponding to the measurement reporting event configured by the base station for the terminal according to the current state information of the terminal, wherein the parameter corresponding to the measurement reporting event includes an offset quantity parameter corresponding to the current state information of the terminal; or a corresponding measurement reporting event and/or a parameter corresponding to the measurement reporting event configured by the base station for the terminal according to the current state information of the terminal, wherein a trigger condition of the measurement reporting event is the current state information of the terminal or a change in the current state information.

Optionally, in a case that the computer program is executed by the processor 901, the processor 901 may further implement the following step: prior to performing, according to the information of the measurement configuration transmitted by the base station, measurement reporting, reporting the current state information of the terminal to the base station.

Optionally, in a case that the computer program is executed by the processor 901, the processor 901 may further implement the following step: prior to performing, according to the information of the measurement configuration transmitted by the base station, measurement reporting, transmitting, to the base station, index information of the measurement configuration according to the current state information of the terminal, wherein there is a mapping relationship between the index information of the measurement configuration and the current state information of the terminal.

Optionally, in a case that the computer program is executed by the processor 901, the processor 901 may further implement the following step: prior to performing, according to the information of the measurement configuration transmitted by the base station, measurement reporting, transmitting, to the base station, information of a measurement reporting mode in which the terminal currently is or the terminal is expected to be; wherein different measurement reporting modes correspond to different measurement configurations.

Optionally, in a case that the computer program is executed by the processor 901, the processor 901 may further implement the following step: performing the measurement reporting according to different measurement configurations corresponding to measurement reporting modes configured by the base station.

The terminal 900 may implement various processes implemented by the terminal in the foregoing embodiments and details are not described herein again to avoid repetition.

For the terminal 900 in some embodiments of the present disclosure, since the information of the measurement configuration transmitted by the base station is determined according to the current state information of the terminal, differentiated configuration may be achieved. In a case that the terminal is in some states that do not require frequent measurement reporting, a quantity of times of measurement reporting is reduced to achieve the purpose of saving power.

Figure 10:
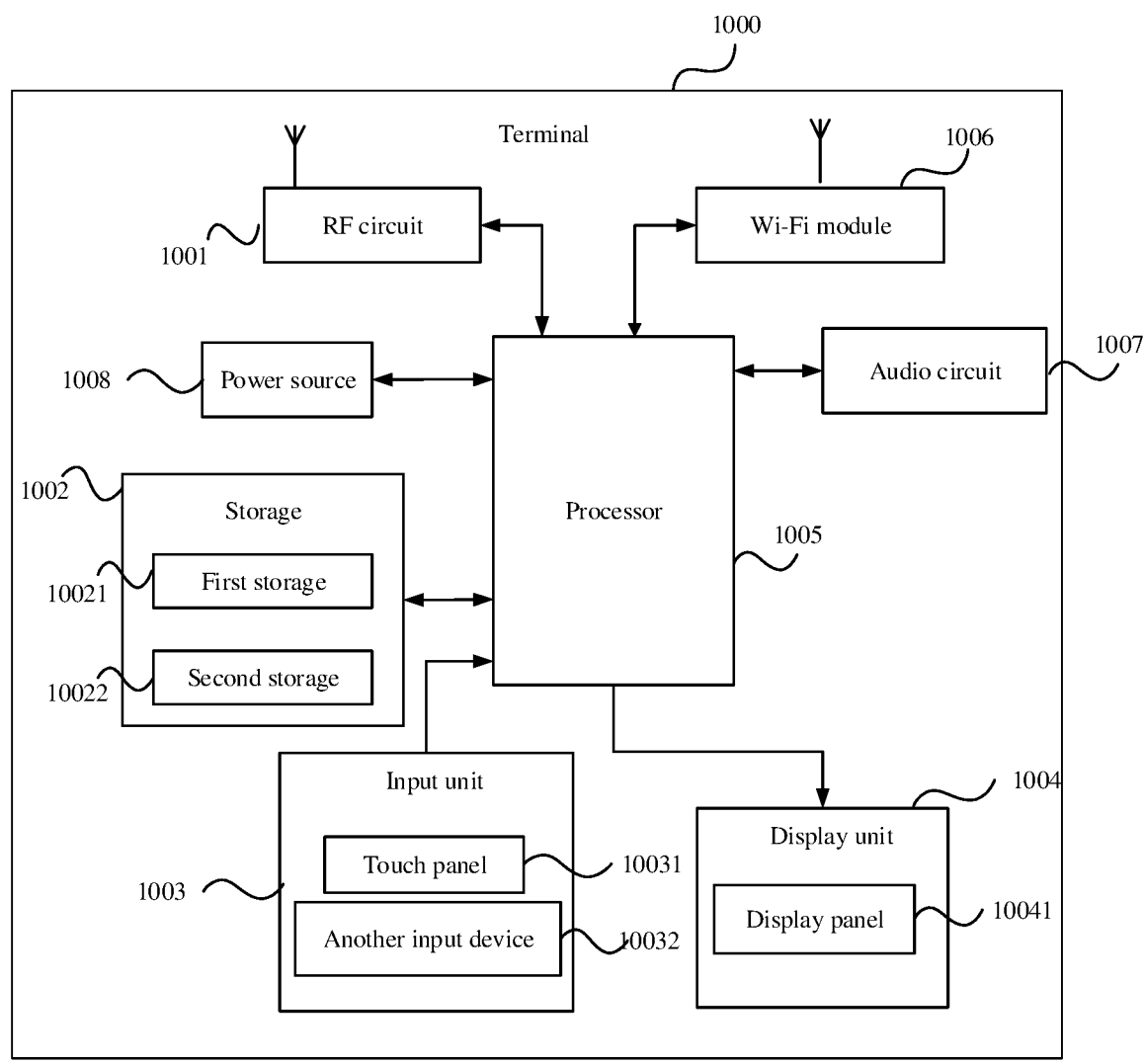
FIG. 10 is another structural diagram illustrating a terminal according to some embodiments of the present disclosure.

Referring to FIG. 10, some embodiments of the present disclosure provide a terminal 1000. Specifically, the terminal 1000 in FIG. 10 may be a mobile phone, a tablet computer, a Personal Digital Assistant (PDA), or a car computer, etc.

The terminal 1000 in FIG. 10 includes a Radio Frequency (RF) circuit 1001, a storage 1002, an input unit 1003, a display unit 1004, a processor 1005, a Wireless Fidelity (WIFI) module 1006, an audio circuit 1007, and a power source 1008.

The input unit 1003 may be configured to receive numeric information or character information inputted by a user and generate a signal input related to user's settings and function control of the terminal 1000.

Specifically, in some embodiments of the present disclosure, the input unit 1003 may include a touch panel 10031. The touch panel 10031, also referred to as a touch screen, may collect touch operations of a user thereon or nearby (such as a user's operation on the touch panel 10031 using any suitable object or accessory such as a finger or a stylus), and drives corresponding connection devices according to a preset program. Optionally, the touch panel 10031 may include two parts, namely a touch detection device and a touch controller. The touch detection device detects a touch orientation of the user, and detects a signal generated by the touch operation, and transmits the signal to the touch controller; the touch controller receives touch information from the touch detection device, converts the touch information into a coordinate of a touch point, transmits the coordinate to the processor 1005, and may receive and execute a command transmitted from the processor 1005. In addition, the touch panel 10031 may be implemented in various types such as a resistive type, a capacitive type, an infrared type, and a surface-acoustic-wave type, etc. Besides the touch panel 10031, the input unit 1003 may further include other input devices 10032. The other input devices 10032 may include, but are not limited to, one or more of a physical keyboard, a function button (such as a volume control button, a switch button, etc.), a trackball, a mouse, and a joystick, etc.

The display unit 1004 may be configured to display information inputted by the user or information provided to the user as well as various menu interfaces of the terminal 1000. The display unit 1004 may include the display panel 1004. Optionally, the display panel 10041 may be configured as a form of an LCD, an Organic Light-Emitting Diode (OLED) or the like.

It should be noted that the touch panel 10031 may cover the display panel 10041 to form a touch display screen, and in a case that the touch display screen detects a touch operation thereon or nearby, the touch operation is transmitted to the processor 1005 to determine the type of the touch event, then the processor 1005 provides a corresponding visual output on the touch display screen based on the type of the touch event.

The touch display screen includes an application program interface display area and a common control display area. An arrangement of the application program interface display area and the common control display area is not limited, and the arrangement of the two display areas may be an up-down arrangement, a left-right arrangement, and the like which may distinguish the two display areas. The application program interface display area may be used to display an interface of an application program. Each interface may include at least one interface element such as an application's icon and/or a widget desktop control. The application program interface display area may also be an empty interface that does not include any content. The common control display area is used to display controls with a high usage rate, such as a setting button, an interface number, a scroll bar, a phone book icon, and the like.

In some embodiments of the present disclosure, by calling a software program and/or module in a first storage 10021 and/or data in a second storage 10022, the processor 1005 implements the following step in a case that the computer program is executed by the processor 1005: performing, according to information of a measurement configuration transmitted by a base station, measurement reporting, wherein the information of the measurement configuration is determined from current state information of the terminal.

Optionally, the current state information of the terminal includes at least one of: a type of the terminal, whether the terminal is movable or not, a highest moving speed of the terminal, a current moving state of the terminal, a current service state of the terminal, a state of a network where the terminal is currently located, and a state of a channel that the terminal is currently in.

Optionally, the information of measurement configuration includes: a corresponding measurement reporting event and/or a parameter corresponding to the measurement reporting event configured by the base station for the terminal according to the current state information of the terminal, wherein the parameter corresponding to the measurement reporting event includes a preset threshold parameter and an offset quantity parameter; or a corresponding measurement reporting event and/or a parameter corresponding to the measurement reporting event configured by the base station for the terminal according to the current state information of the terminal, wherein the parameter corresponding to the measurement reporting event includes an offset quantity parameter corresponding to the current state information of the terminal; or a corresponding measurement reporting event and/or a parameter corresponding to the measurement reporting event configured by the base station for the terminal according to the current state information of the terminal, wherein a trigger condition of the measurement reporting event is the current state information of the terminal or a change in the current state information.

Optionally, in a case that the computer program is executed by the processor 1005, the processor 1005 may further implement the following step: prior to performing, according to the information of the measurement configuration transmitted by the base station, measurement reporting, reporting the current state information of the terminal to the base station.

Optionally, in a case that the computer program is executed by the processor 1005, the processor 1005 may further implement the following step: prior to performing, according to the information of the measurement configuration transmitted by the base station, measurement reporting, transmitting to the base station index information of the measurement configuration according to the current state information of the terminal, wherein there is a mapping relationship between the index information of the measurement configuration and the current state information of the terminal.

Optionally, in a case that the computer program is executed by the processor 1005, the processor 1005 may further implement the following step: prior to performing, according to the information of the measurement configuration transmitted by the base station, measurement reporting, transmitting to the base station information of a measurement reporting mode in which the terminal currently is or the terminal is expected to be; wherein different measurement reporting modes correspond to different measurement configurations.

Optionally, in a case that the computer program is executed by the processor 1005, the processor 1005 may further implement the following step: performing measurement reporting according to different measurement configurations corresponding to measurement reporting modes configured by the base station.

The terminal 1000 may implement various processes implemented by the terminal in the foregoing embodiments and details are not described herein again to avoid repetition.

For the terminal 1000 in some embodiments of the present disclosure, since the information of the measurement configuration transmitted by the base station is determined according to the current state information of the terminal, differentiated configuration may be achieved. In a case that the terminal is in some states that do not require frequent measurement reporting, a quantity of times of measurement reporting is reduced to achieve the purpose of saving power.

A person skilled in the art may be aware that, exemplary units and algorithm steps described in connection with the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions in each particular application scene, but it should not be considered that the implementation goes beyond the scope of the present disclosure.

It may be clearly understood by a person skilled in the art that, for ease of description and conciseness, a detailed working process of the foregoing system, apparatus, and unit may be obtained by referencing a corresponding process in the foregoing method embodiments, and details are not described herein again.

In the embodiments provided in the present application, it should be understood that the disclosed device and method may be implemented in other manners. For example, the described device embodiment is merely exemplary. For example, a division of units is merely a logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into a processing unit, or each of the units may exist alone physically, or two or more units may be integrated into one unit.

If a function is implemented in form of software functional unit and sold or used as an independent product, it may be stored in a computer-readable storage medium. Based on such an understanding, essential part or the part contributing to the prior art of the technical solutions of the present disclosure, or a part of the technical solutions may be implemented in form of a software product. The computer software product is stored in a storage medium, and includes several instructions for instructing a computer device (which may be a personal computer, a server, or a network device) to perform all or a part of the steps of the methods described in the embodiments of the disclosure. The foregoing storage medium includes any medium that may store a program code, such as a universal serial bus (USB) flash drive, a mobile hard disk, an ROM, an RAM, a magnetic disk, or an optical disc.

The aforementioned are merely specific implementations of the present disclosure, but the scope of the disclosure is by no means limited thereto. Any modification or substitution that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A configuration method of measurement reporting, applied to a base station and comprising:

configuring, according to, at least one of whether a terminal is movable or not, a highest moving speed of the terminal, a current moving state of the terminal, a current service state of the terminal, a state of a network where the terminal is currently located and a state of a channel that the terminal is currently in, which are included in current state information of the terminal, information of a corresponding measurement configuration for the terminal, wherein the information of the measurement configuration is used for measurement reporting of the terminal;

wherein, configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, comprises:

configuring, for the terminal, a corresponding measurement reporting event and a parameter corresponding to the measurement reporting event according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal; wherein the parameter corresponding to the measurement reporting event comprises an offset quantity parameter corresponding to the current state information of the terminal; and a trigger condition of the measurement reporting event is the current state information of the terminal or a change in the current state information.

2. The configuration method of measurement reporting according to claim 1, wherein, prior to configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, the method further comprises:
receiving the current state information of the terminal reported by the terminal.

3. The configuration method of measurement reporting according to claim 1, wherein, prior to configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, the method further comprises:
receiving index information of a measurement configuration transmitted by the terminal, wherein there is a mapping relationship between the index information of the measurement configuration and the current state information of the terminal;
wherein, configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, comprises:
configuring the information of the corresponding measurement configuration for the terminal according to the index information of the measurement configuration transmitted by the terminal.

4. The configuration method of measurement reporting according to claim 1, wherein, prior to configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, the method further comprises:
receiving information of a measurement reporting mode that the terminal is currently in or the terminal is expected to be in;
wherein different measurement reporting modes correspond to different measurement configurations.

5. The configuration method of measurement reporting according to claim 1, wherein, prior to configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, the method further comprises:
estimating the current state information of the terminal according to mobility information of the terminal.

6. The configuration method of measurement reporting according to claim 1, wherein, configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, comprises:
configuring, according to the current state information of the terminal, a corresponding measurement reporting mode for the terminal, wherein different measurement reporting modes correspond to different measurement configurations.

7. The configuration method of measurement reporting according to claim 1, wherein, the current state information of the terminal further comprises a type of the terminal.

8. A measurement reporting method, applied to a terminal and comprising:
performing, according to information of a measurement configuration transmitted by a base station, measurement reporting, wherein the information of the measurement configuration is determined from at least one of whether the terminal is movable or not, a highest moving speed of the terminal, a current moving state of the terminal, a current service state of the terminal, a state of a network where the terminal is currently located and a state of a channel that the terminal is currently in, which are included in current state information of the terminal;
wherein, the information of the measurement configuration, comprises:
a corresponding measurement reporting event and a parameter corresponding to the measurement reporting event configured by the base station for the terminal according to the current state information of the terminal; wherein the parameter corresponding to the measurement reporting event comprises an offset quantity parameter corresponding to the current state information of the terminal; and a trigger condition of the measurement reporting event is the current state information of the terminal or a change in the current state information.

9. The measurement reporting method according to claim 8, wherein, prior to performing, according to the information of the measurement configuration transmitted by the base station, the measurement reporting, the method further comprises:
reporting the current state information of the terminal to the base station.

10. The measurement reporting method according to claim 8, wherein, prior to performing, according to the information of the measurement configuration transmitted by the base station, the measurement reporting, the method further comprises:
transmitting, to the base station, index information of a measurement configuration according to the current state information of the terminal, wherein there is a mapping relationship between the index information of the measurement configuration and the current state information of the terminal.

11. The measurement reporting method according to claim 8, wherein, prior to performing, according to the information of the measurement configuration transmitted by the base station, the measurement reporting, the method further comprises:
   transmitting, to the base station, information of a measurement reporting mode that the terminal is currently in or the terminal is expected to be in;
   wherein different measurement reporting modes correspond to different measurement configurations.

12. The measurement reporting method according to claim 8, further comprising:
   performing the measurement reporting according to different measurement configurations corresponding to a measurement reporting mode configured by the base station.

13. A terminal, comprising:
   a storage and a processor, wherein a computer program executable by the processor is stored in the storage, and in a case that the computer program is executed by the processor, the processor implements steps of the measurement reporting method according to claim 8.

14. The measurement reporting method according to claim 8, wherein, the current state information of the terminal further comprises a type of the terminal.

15. A base station, comprising:
   a storage and a processor,
   wherein a computer program executable by the processor is stored in the storage, and in a case that the computer program is executed by the processor, the processor implements:
   configuring, according to, at least one of whether a terminal is movable or not, a highest moving speed of the terminal, a current moving state of the terminal, a current service state of the terminal, a state of a network where the terminal is currently located and a state of a channel that the terminal is currently in, which are included in current state information of the terminal, information of a corresponding measurement configuration for the terminal, wherein the information of the measurement configuration is used for measurement reporting of the terminal;
   wherein, when configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, the processor is configured to implement:
   configuring, for the terminal, a corresponding measurement reporting event and a parameter corresponding to the measurement reporting event according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal; wherein the parameter corresponding to the measurement reporting event comprises an offset quantity parameter corresponding to the current state information of the terminal; and a trigger condition of the measurement reporting event is the current state information of the terminal or a change in the current state information.

16. The base station according to claim 15, wherein, prior to configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, the processor is configured to implement:
   receiving the current state information of the terminal reported by the terminal.

17. The base station according to claim 15, wherein, prior to configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, the processor is configured to implement:
   receiving index information of a measurement configuration transmitted by the terminal, wherein there is a mapping relationship between the index information of the measurement configuration and the current state information of the terminal;
   wherein when configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, the processor is configured to implement: configuring the information of the corresponding measurement configuration for the terminal according to the index information of the measurement configuration transmitted by the terminal.

18. The base station according to claim 15, wherein, prior to configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, the processor is configured to implement:
   receiving information of a measurement reporting mode that the terminal is currently in or the terminal is expected to be in;
   wherein different measurement reporting modes correspond to different measurement configurations.

19. The base station according to claim 15, wherein, prior to configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, the processor is configured to implement:
    estimating the current state information of the terminal according to mobility information of the terminal.

20. The base station according to claim 15, wherein when configuring, according to at least one of whether the terminal is movable or not, the highest moving speed of the terminal, the current moving state of the terminal, the current service state of the terminal, the state of the network where the terminal is currently located and the state of the channel that the terminal is currently in, which are included in the current state information of the terminal, the information of the corresponding measurement configuration for the terminal, the processor is configured to implement:
    configuring, according to the current state information of the terminal, a corresponding measurement reporting mode for the terminal, wherein different measurement reporting modes correspond to different measurement configurations.

\* \* \* \* \*